(12) United States Patent
Bünte et al.

(10) Patent No.: US 9,024,563 B2
(45) Date of Patent: May 5, 2015

(54) PITCH MOTOR DRIVE CIRCUIT WHICH CAN OPERATE IN EMERGENCY MODE

(75) Inventors: Andreas Bünte, Rheda-Wiedenbrück (DE); Harald Wertz, Soest (DE); Christian Kleinen, Gevelsberg (DE); Harry Gill, Wetter (DE)

(73) Assignee: LTi REEnergy GmbH, Unna (DE)

( * ) Notice: Subject to any disclaimer, the term of this patent is extended or adjusted under 35 U.S.C. 154(b) by 124 days.

(21) Appl. No.: 13/882,637

(22) PCT Filed: Oct. 25, 2011

(86) PCT No.: PCT/EP2011/068670
§ 371 (c)(1),
(2), (4) Date: Jun. 27, 2013

(87) PCT Pub. No.: WO2012/059368
PCT Pub. Date: May 10, 2012

(65) Prior Publication Data
US 2013/0271056 A1    Oct. 17, 2013

(30) Foreign Application Priority Data
Nov. 5, 2010   (DE) .......................... 10 2010 060 380

(51) Int. Cl.
*H02P 27/06*   (2006.01)
*F03D 7/02*    (2006.01)
(Continued)

(52) U.S. Cl.
CPC .............. *H02P 27/06* (2013.01); *F03D 7/0224* (2013.01); *F05B 2260/76* (2013.01);
(Continued)

(58) Field of Classification Search
CPC ....................................... H02P 27/06

USPC .................. 318/503, 494, 801, 800, 799, 798
See application file for complete search history.

(56) References Cited

U.S. PATENT DOCUMENTS 5,070,290 A * 12/1991 Iwasa et al. .................... 318/758
7,764,029 B2 * 7/2010 Buente et al. .................. 318/105

FOREIGN PATENT DOCUMENTS

DE         10335575 B4   10/2005
EP          1707429 A1   10/2006
(Continued)

OTHER PUBLICATIONS

International Search Report for corresponding application PCT/EP2011/068670 filed Oct. 25, 2011; Mail date Oct. 22, 2012.
(Continued)

*Primary Examiner* — David S Luo
(74) *Attorney, Agent, or Firm* — Muncy, Geissler, Olds & Lowe, P.C.

(57) ABSTRACT

A pitch drive circuit that operates in an emergency mode, for a wind or water power plant. The circuit has at least one rectifier unit, at least one DC intermediate circuit, two inverter units and a pitch rotary current motor with motor trains that can be contacted on both sides. A first contact side of the motor trains is connected to a first inverter unit and a second contact side of the motor trains is connected to a second inverter unit. At least one switching element is connected to at least one contact side of the motor trains. In a normal operating mode of a first switching state of the switching element the motor trains can be energized via both inverter units, and in an emergency operating mode of a second switching state of the switching element, the motor trains can be energized via a single inverter unit.

14 Claims, 8 Drawing Sheets

Figure 1:
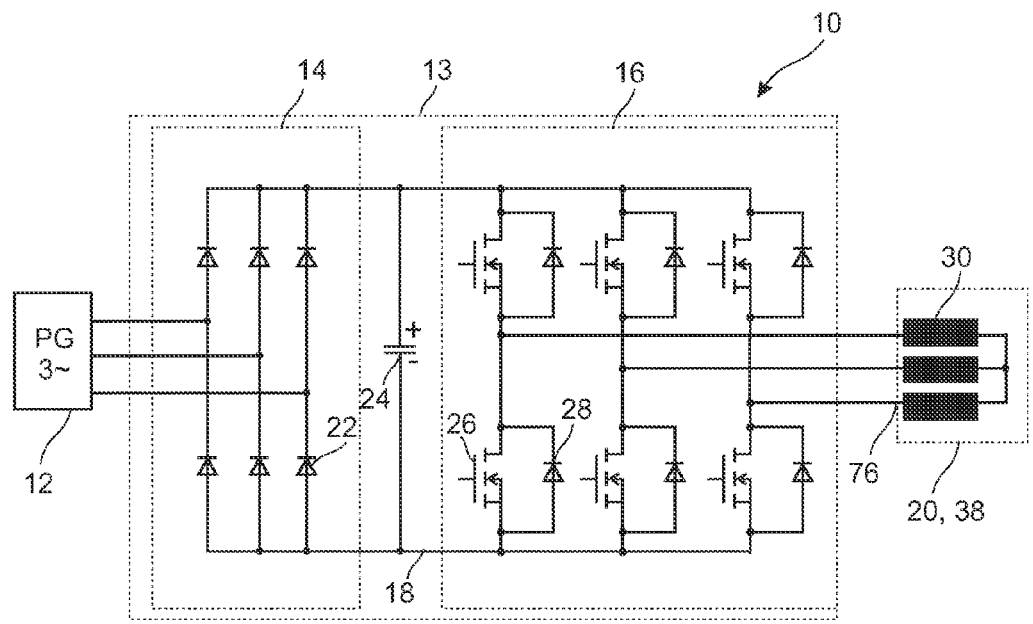

(51) Int. Cl.
    *H02P 25/18*     (2006.01)
    *H02P 29/02*     (2006.01)
    *H02J 9/04*     (2006.01)
    *H02M 1/32*     (2007.01)

(52) U.S. Cl.
    CPC ...... *F05B 2260/79* (2013.01); *F05B 2260/845* (2013.01); *F05B 2270/107* (2013.01); *F05B 2270/1074* (2013.01); *F05B 2270/602* (2013.01); *H02J 9/04* (2013.01); *H02M 2001/325* (2013.01); H02P 25/18 (2013.01); H02P 25/184 (2013.01); H02P 29/02 (2013.01); *Y02E 10/723* (2013.01); *Y02E 10/766* (2013.01); *Y02B 10/72* (2013.01)

(56) References Cited

FOREIGN PATENT DOCUMENTS

| | | |
|---|---|---|
| JP | 63245265 A | 10/1988 |
| JP | 2009273348 A | 11/2009 |
| WO | 2009058357 A1 | 5/2009 |
| WO | 2010034906 A2 | 4/2010 |

OTHER PUBLICATIONS

International Preliminary Report on Patentability for corresponding application PCT/EP2011/068670 filed Oct. 25, 2011; Mail date Mar. 22, 2013.

\* cited by examiner state of the art state of the art state of the art

PITCH MOTOR DRIVE CIRCUIT WHICH CAN OPERATE IN EMERGENCY MODE

PRIOR ART

The present invention relates to a motor drive circuit that can operate in emergency operation mode for an AC pitch drive of a wind or water turbine system and which comprises at least one rectifier unit, at least one DC intermediate circuit and two inverter units, where a first contact side of the motor trains of the pitch three-phase motor can be supplied with current by a first inverter unit and a second contact side of the motor trains can be supplied with current by a second inverter unit.

Pitch drives are used in wind or water turbine systems to adjust the flow angle of a drive medium relative to a blade of a rotor/turbine. The drive medium is flowing wind in the case of a wind turbine and flowing water in the case of a water turbine. By means of the motor-driven adjustment of the pitch, i.e. of the pitch angle of the rotor blade, it is possible to adjust the speed of the energy generating system, for example in order to achieve the highest possible efficiency at low flow rates and to prevent overload at very high flow rates. Rotors/turbines in each case typically provided with one pitch drive per blade, however, centrally arranged pitch drive assemblies also exist which adjust the pitch of all or at least a plurality of blades centrally. The subject matter of the invention can be implemented in both decentrally and centrally arranged pitch drive devices.

Generic pitch drive devices use in many cases three-phase motors for adjustment of the pitch angle and employ for that purpose converter devices which in principle comprise a rectifier which generates a DC voltage for a DC voltage intermediate circuit from an AC grid power supply, where this intermediate circuit feeds an inverter. The rectification may be uncontrolled or controlled, for example using a phase angle control. Active feed units, which may also be regenerative, are also conceivable. The actual design of the rectifier corresponds to the prior art, so that this unit, which supplies the intermediate circuit, is always referred to hereafter as a rectifier. The inverter is used to convert the DC voltage of the intermediate circuit into an alternating current for supplying the three-phase motor. The inverters function on the basis of power electronic switches, for example by means of three half-bridges that are designed as, for example, MOSFET, IGBT or IGCT transistors. These produce a variable voltage by pulse width modulation, where the magnitude of the output voltage and the frequency can be controlled within a wide range to drive both asynchronous and synchronous motors. As a result, any speed or torque of the three-phase motors can be set. The motor trains of the motor are interconnected in a wye or delta circuit at least on one contact side.

Pitch drives are generally driven by powerful, wear-free and robust AC drives. These have however the disadvantage that failure of the AC grid or a malfunction of the converter device will cause complete failure of the pitch drive, so that the pitch will no longer change, and the turbine system can no longer be controlled. This mostly happens under adverse circumstances, for example a storm, during which a lightning strike not infrequently disables the AC grid or the motor electronics. There is the associated risk that the turbine system will be overloaded and damaged or destroyed.

For this reason, such turbine systems may have an emergency power storage capability, which on the basis of an auxiliary power source, usually a battery or accumulator, can provide a DC power supply. This in turn leads to the problem that an AC drive device is supplied in emergency operation mode with DC voltage. This problem is solved in that a three-phase pitch drive motor can be operated by feeding a direct current to an intermediate circuit of an inverter. This however leads to the problem that a malfunction of the inverter unit results in complete failure of the pitch drive, and the system can no longer be controlled.

The invention relates to an emergency operation mode of a pitch motor drive circuit, in which an increased fail-safety in the operation of the three-phase motor can be assured by redundancy of the inverter unit. Various approaches are known from the prior art for this, for example the redundant design of the entire drive system, where two or more converter devices are used together with two or more three-phase motors. In addition, drive circuits exist in which a single motor can be controlled by two parallel switchable converter devices. With this approach, a drive branch that is redundant in normal operation is kept ready for emergency operation, as a result of which manufacturing and maintenance expenses are increased without any additional benefit for normal operation.

DE 103 35 575 B4 discloses a pitch drive circuit which can be operated in an emergency, in which an energy storage device can be charged by means of the rectifier of a converter circuit. The emergency operation mode is based on disruption-free operation of the single inverter.

A converter device capable of emergency operation is described in JP 63 245 265, which in normal operation is connected as a delta circuit and in emergency operation mode as a wye circuit.

Drive devices used for other purposes make use of proposals for a motor drive circuit for a three-phase motor with motor trains accessible on both sides, i.e. a motor in which the motor trains, i.e. individual interconnected stator windings and also rotor windings, are accessible from the outside from two contact sides. The motor trains of a first contact side are connected to a first converter device and those of the second contact side are connected to a second converter device. Synchronized control of the inverters, which are incorporated in the converter devices, enables higher motor outputs to be achieved by this double converter operation. These double converter circuits generate more power from the fact that with the same intermediate circuit voltage a higher voltage can be applied to the three-phase motor than with a conventional converter device; the motor can thus be designed for a specified performance with a higher rated voltage, but lower rated current. The maximum voltage at a given moment that a servo-controller converter can supply to a motor configured in a wye circuit is the DC intermediate circuit voltage. With a conventional converter, this voltage acts as a chained voltage across two trains of the motor. With a double converter, this maximum voltage can act as a phase voltage, while at the same time the winding strands can be subject to the same currents and thus identical torque values can be achieved. Increasing the voltage by a factor of $\sqrt{3}$ leads to an increase in the rated speed and thus the motor power. Alternatively, with an adapted motor selection the rated current can be reduced by a factor of $\sqrt{3}$ right from the beginning.

For double converter operation, it is necessary for both converters to operate with precise synchronization. This synchronization can be achieved by, for example, a communication control cable which enables the synchronization and setting of important parameters. It may be advantageous here that the two intermediate circuits of the two converter devices which supply current to the two sides of the motor trains of the three-phase motor are connected to one another to enable energy exchange between the two intermediate circuits of the converter devices.

However, it has been found in particular with safety-relevant drive systems, such as a pitch drive, that converter devices are at markedly greater risk of failure, in particular in the event of overvoltage, lightning strike or overload, than electromechanical drive motors. Such safety-relevant applications can, in addition to a pitch drive circuit of a wind or water turbine system, in which the failure of the pitch control can lead to the destruction of the power plant, also be lift motors, door operators, vehicle drives, pump or compressor drives or other safety-relevant drive systems.

The problem thus arises from the prior art of developing a motor drive circuit in such a way that it has a high redundancy and reliability against failure even in double converter operating mode, where there is an increased risk of failure from the arrangement of two converter devices, and at the same time the advantages of a double converter circuit can be exploited for a safety-relevant drive system.

The above disadvantages are overcome by a circuit according to independent claim 1 and to a method for operating a pitch drive circuit according to the independent claims.

DISCLOSURE OF THE INVENTION

A pitch motor drive circuit that can operate in an emergency is proposed in accordance with the invention for a wind or water turbine system and comprises at least one rectifier unit, at least one DC intermediate circuit, two inverter units and one pitch three-phase motor with motor trains that can be contacted on both sides, where a first contact side of the motor trains is connected to a first inverter unit and a second contact side of the motor trains is connected to a second inverter unit. At least one switching element is connected to at least one contact side of the motor trains, where in normal operation of a first switching state of the switching element the motor trains can be supplied with current by both inverter units, and in an emergency operation of a second switching state of the switching element the motor trains can be supplied with current by a single inverter unit.

In other words, the invention proposes a double inverter drive circuit in which a pitch three-phase motor, which can have motor trains contactable on both sides, in particular three motor trains, but also a plurality of motor trains, can be supplied with current by two inverter units. A decoupling switching element can be arranged in the connection between each inverter unit and one contact side of the motor trains for switchable connection and for decoupling in the event of a fault. At least one switching element, for example an electromechanical contactor element or an electronic switching element, can be arranged on at least one contact side, but conceivably also on both contact sides, which in the event of failure of one inverter unit can switch to a second switching position in which in an emergency operation mode current can be supplied by the remaining active inverter unit. A normal operation can therefore be implemented in which the motor can be supplied with current by both inverter units to achieve an approximately 70% higher drive output of the motor. In such a case with, for example, a 400-volt AC grid, motors can be used that in a wye circuit are envisaged for 690-volt grids. The output range can thus be increased by a factor of 1.73. This creates fewer current ripples, i.e. a lower degree of total harmonic distortions (THD), in motor mode, so that disruptive grid feedback is reduced. Furthermore, motors with lower inductivity such as high-speed motors can be used to achieve a comparable drive power/torque and speed. Since in safety-relevant drives the use of dual inverter units would lead to an increased risk of failure of the semiconductor parts, it is proposed that at least one switching element be arranged in the motor train lines such that in the event of failure of at least one inverter unit current can be supplied to the three-phase motor by the remaining inverter unit. It is in principle conceivable here that the switching element short-circuits the motor trains of one contact side in order to obtain a wye circuit, or connects corresponding motor trains of both contact sides such that a delta circuit is obtained. A standard three-phase motor can be used as a motor in which all six winding ends lead out, as is typically the case for asynchronous motors. If synchronous motors are used, in particular permanent synchronous motors, then access to all six winding ends is generally possible without too much difficulty.

The invention is restricted to rotating field motors, since an improvement in the redundancy for DC motors can be created by deploying a DC emergency power source. The motor drive circuit capable of emergency operation combines the advantages of a double inverter operation with a high redundancy, i.e. immunity to faults, so that with a safety-relevant pitch drive for adjusting the rotor blade of a wind or water turbine system, but also with an automotive transmission, a lift drive or door operator, a pump or compressor drive, a high level of safety against failure can be achieved.

According to an advantageous further development, in a second switching state of the switching element the contact side of the motor trains can be short-circuited to form a Y-circuit (wye circuit), where all motor trains on each contact side can preferably be connected to a switching element in each case. The switching element short-circuits all contacts of the motor trains of one contact side so that a wye operation of the motor is possible when power is supplied to the motor trains of the opposite contact side. Each inverter unit can therefore perform a Y power supply to the motor. In the context of a wye circuit, a high torque can be generated, where the speed is limited. In particular for the production of a high starting torque, a wye circuit of this type can be used especially for start-up of the motor. Only thereafter is it possible to switch for example to normal operation with both active inverter units. If one of the two inverters is inherently more susceptible to interference from the start, then its contact side can be short-circuited to increase the redundancy by means of the wye switching element in the event of failure, so that at least the respective contact side can be short-circuited by means of a switching element.

As a rule, both inverter units are identical, so that there is a probability of failure in both inverter strands. For this reason, two Y-switching elements can preferably be arranged on both contact sides of the three-phase motor so that in the event of failure of one inverter unit they short-circuit the Y-switching element of the corresponding contact side to continue to supply power to the three-phase motor in wye circuit using the inverter unit of the opposite contact side. Operation with torque maintained but at lower speeds can therefore be continued. In Y-emergency operation, a full torque at reduced maximum speed is possible.

In a further advantageous embodiment of the invention, the two contact sides of the motor trains can be connected to one another to form a Δ-circuit (delta circuit). In a second switching state of the switching element the switching element can short-circuit the motor trains, each offset by 120°, of both contact sides in emergency operation mode, so that a delta circuit of the motor trains can be achieved, with current supply being possible from one inverter unit side and from the other inverter unit side. In this case, a single switching element is sufficient to integrate the motor into a circuit capable of emergency operation, so that current supply on both sides is possible by one inverter unit. In all cases however, it is necessary to prevent the active operation of both inverter units with the second switching state of the switching element, as this could lead to a short-circuit of the inverter units. In the context of a delta circuit of the motor trains, the motor can be operated at full speed but with a reduced torque. A wye circuit or delta circuit can therefore be achieved, depending on the arrangement in wye or delta configuration of the switching elements, in order to ensure either a high torque or a high speed in emergency operation.

In accordance with an advantageous further development, at least one, and preferably two, Y-switching elements on opposite contact sides can be switchably connected to the motor trains to form a Y-circuit and a further Δ connection to form a Δ-circuit in the second switching position. In this case, in particular three emergency operation switching elements, two Y-switching elements which are designed for alternate wye operation by means of one inverter unit each, and one Δ-switching element designed for delta operation of the motor are all arranged on both contact sides of the motor. In the context of a higher-level control logic, for example, when starting the motor in emergency operation mode, a wye circuit can be active, but after reaching a nominal speed can be switched to a delta circuit, in order to allow either a high start-up torque or high rated speed to be reached, depending on requirements. The advantages of a classic wye delta circuit in emergency operation mode are therefore combined with the advantageous characteristics of double inverter operation.

According to an advantageous further development of the invention, at least one switching element, in particular a Y-switching element, can be a semiconductor switching element, in particular a semiconductor star-point switching element. In principle, the switching elements can be of any desired design and can, for example, be three-pole or multipole electromechanical contactors. In particular, the switching elements in the second switching position of the emergency operation mode can disconnect each inactive or failed inverter unit from the motor trains and thus have at least six switching contacts. However, in the case of a Y-switching element in particular, which has the task of short-circuiting the motor trains of one contact side, but also for a Δ-switching element, or an isolating element/decoupling switching element, this can be in the form of a maintenance-free semiconductor switching element. The semiconductor switching element can thus include a bridge rectifier unit which can rectify the currents of the individual motor trains and a thyristor switching element which short-circuits the rectified DC voltage between the motor trains of a contact side by ignition of the thyristor, and thus brings about a short-circuit of the motor trains. Alternatively, it is possible to use a combination of bridge rectifier and transistor switching element, an antiparallel switching of a diode-transistor series circuit, or a TRIAC switching element or comparable semiconductor switching elements. Mechanical wear on the switching element can be avoided by using a semiconductor switching element, and it is possible to assure a high mechanical resistance, switching spark suppression and long service life with low maintenance requirements and costs.

According to an advantageous further embodiment, each inverter unit can be connected to its own rectifier unit with DC intermediate circuit to form an independent converter device, where the two DC intermediate circuits of both inverter devices are preferably also connected to one another. In particular, a switching element can be arranged in the connection of the DC intermediate circuits for switchable connection/disconnection in the event of a fault. In principle, it is sufficient to provide a single rectifier unit which provides a DC intermediate circuit to which both inverter units are connected in order to derive a phase-commutated PWM voltage from the DC intermediate circuit voltage for operation of the motor. Inverter devices are however available as standard on the market, in which a rectifier unit with DC intermediate circuit and an inverter unit are already integrated. This further embodiment now proposes the use of two commercially available inverter devices to supply current to the three-phase motor, where each inverter device has a separate rectifier unit with DC intermediate circuit. To ensure a current flow via the two inverter units, at least one, and preferably both, potentials of the DC intermediate circuit of the two inverter devices can be connected at least switchably to one another to enable at least in normal operation parallel provision of the DC intermediate circuit voltage, to permit a closed circuit and an increased reliability against failure by a redundant design of the DC intermediate circuit. Thus in a case of emergency operation a bridge rectifier unit can be switched off so that a single bridge rectifier unit can supply the two inverter units of both converter devices with voltage. If the voltage necessary to do so is not sufficient, or an inverter unit has failed, then an emergency operation can be established by switching a switching element to the second switching state, for example by means of a wye or delta circuit of the motor with only one inverter device. The use of standard converter devices permits a considerable reduction in the costs for realization of the motor circuit capable of emergency operation.

Following on the previous example embodiment, it can be very advantageous to combine the two inverter devices with one communication control line for synchronization purposes. The use of the communication control line, which for example transmits a field bus system, allows one converter device to be switched as a master converter device and a second converter device to be switched as a slave converter device, which provides pulsing of the master converter device for the generation of synchronous PWM signals of the slave converter device for phase-correct operation of the motor. The communication control line enables transmission of, for example, PWM switching data, PWM switching frequency, PWM switching phase data for switching frequency synchronization, rotor rotation angle, field-oriented control parameters such as field alignment, vector control data and space pointer alignment of rotors and/or stator magnetic field, phase and frequency information etc., between the inverter units and/or their control means. Furthermore, the supply voltages can be parameterized or brake resistor switch-on thresholds can be set synchronously. The communication control line can be in digital design as a field bus and, for example if there is a failure of the intermediate circuit voltage of a converter device or other disturbances, indicate the initiation of emergency operation.

Furthermore, the two converter devices can be used to perform control of zero current components. A zero current exists if the sum of the three motor currents is not zero. This zero current component is undesirable since it leads to unwanted losses in the motor and in the converter units and may also cause torque fluctuations. One of the causes of zero current is parasitic asymmetries of the two inverters, for example in different forward voltages, different switching times of the semiconductors or measuring errors of flow sensors that affect the actual values via the current control. This zero current can be minimized to reduce the flow of current and energy consumption, where a corresponding control method can be used.

Alternatively or additionally, at least one converter device, preferably both converter devices, can comprise at least one rotation angle/rotation speed or comparable sensor which can determine an angle of rotation of the motor drive train. For example, the orientation of the field can be set on the basis of the rotation angle sensor. If rotation angle sensors are connected to both converter devices, then in the event of failure of the rotation angle sensor of one converter device the data from the rotation angle sensor of the second converter device can be used to control the first converter device, where the corresponding sensor data can also be exchanged via the communication control line. This results in an increase in redundancy in the sensor determination of the state variables of the three-phase motor.

Alternatively or additionally, at least one converter device, and preferably both converter devices, can be connected to a braking chopper unit. Brake choppers transmit excess energy from the DC intermediate circuits to a braking resistor, said energy being converted into heat as a result. This energy can for example be generated in a regenerative operation or braking operation of the three-phase motor. If the energy were not passed to a braking resistor, then the intermediate circuit voltage would rise instead and the capacitors in the intermediate circuit could be overloaded or destroyed. Alternatively, the regenerative energy obtained can be fed back into the power grid, for which inverter units on the grid side can be used. Arrangement of braking chopper units on or in each converter device advantageously allows alternate active switching of the braking chopper units, so that the dissipation energy obtained per braking chopper unit can be halved. If one of the two braking chopper units fails or is not in use, then the maximum braking power can be passed to the available braking chopper unit. This yields an increased redundancy for braking chopper operation and thus improved protection of the converter devices.

According to a further advantageous example embodiment, the two converter devices can be connected to a power grid via a secondary-side dual-designed grid transformer, where the two intermediate circuits can be electrically at least switchably connected to one another. Thus the use of two converter devices permits the supply of both converter devices with two independent and electrically separate secondary-side transformer coil sets, so that if one secondary coil system fails then at least emergency operation is possible with the remaining secondary coil system and one inverter unit. The isolating transformer can have, for example, a Yyd, Dyd or Dyz coil configuration, i.e. the primary side is operated in a first three-phase switching configuration and connected to a power grid, and the two secondary coils are operated in a second and third, in particular a different switching configuration, wye, delta or zigzag. It is only important that the two secondary windings have a 30° phase displacement, as is usual for a B12 rectification. A Yyd grid transformer may for example be used, which comprises on the primary grid side wye-connected transformer coils and on the secondary side wye-connected and delta-connected transformer coils to supply both converter devices. A failure of the secondary side coil can be redundantly handled by means of the isolating transformer. In addition, the dual-designed isolating transformers on the secondary side have a lower high-frequency signal fault feedback effect on the grid and the low-frequency current harmonics are drastically reduced, by which the THD interference signal portion (total harmonic distortion) of the motor drive in particular can be reduced in a grid-disruption-sensitive environment since the grid phases are offset relative to one another and harmonics are smoothed due to the high inductivities. The intermediate circuits of both inverter units must be connected to one another for a double converter operation in order to enable a current flow between both inverter units. In the event of a fault, this connection can be disconnected to prevent short-circuit currents, for which a decoupling switching element can be arranged between the two DC voltage circuits. These reduced grid feedback effects are seen in particular during use of the drive circuit in an electrically sensitive environment.

In accordance with a further advantageous example embodiment, a zero current control unit can be connected to both inverter units so that in normal operation a zero current is minimized by the motor trains. The zero current control unit can compensate for these parasitic asymmetries to a very large extent by appropriate control of the two inverter units. Thus, a zero current control unit can minimize power consumption and hence increase the efficiency and the service life of the power semiconductor components.

According to an advantageous embodiment of the invention, a DC emergency power storage device, in particular an accumulator or a high-capacitance capacitor arrangement, can be connected to at least one DC intermediate circuit, at least switchably and/or indirectly, for supplying voltage to the intermediate circuit if there is a failure of the grid-based DC power supply. Thus at least the DC intermediate circuit of an inverter unit can be at least switchably connected to a DC emergency power supply so that in the event of failure of the grid power supply or of a bridge rectifier unit a controlled emergency operation is enabled in combination with the second switching position of the switching element. In particular, both intermediate circuits can be supplied separately and independently by two or more emergency power switching elements switchably using the DC emergency power storage device. In this case, in so far as a galvanic connection of the two intermediate circuits is provided, the intermediate circuit connection should be isolatable by means of a decoupling switching element, so that in emergency operation mode both a double converter operation and a single converter operation can be ensured, where at least with single converter operation an unwanted current flow between the two intermediate circuits can be prevented. The DC emergency power storage device can also be connected to the intermediate circuit via a decoupling semiconductor, for example a decoupling diode or decoupling diac or other active semiconductor switching elements in combination with or also without emergency power switching elements, in order to permit a directed current flow and to prevent an unwanted feedback to the energy storage device. In addition, a combination of decoupling semiconductor and decoupling switching element is conceivable. The emergency power storage device can take up regenerative energy from the intermediate circuit and hence stabilize the intermediate circuit voltage. As a result, emergency operation can be ensured in the event of total failure of the grid, of the bridge rectifier units and/or of an inverter unit by means of the DC emergency power storage device and at least one single inverter unit, so that the rotor blade of a wind turbine can be moved into a feather position.

According to a further advantageous embodiment, each inverter unit can be switchably connected via at least one decoupling switching element to the motor trains of one contact side, so that the half-bridges of an inverter unit can in the case of emergency operation be separated from the contact side of the three-phase motor. Thus in the event of failure of an inverter unit, the latter can be disconnected so that internal short-circuits of the inverter unit do not have a disruptive effect on emergency operation of the three-phase motor. Furthermore, a decoupling of the de-energized contact side of the motor from the inactive inverter unit can be enabled to protect the motor and also the power semiconductor components of the inverter units, in order to prevent further damage.

Alternatively and also additionally, each inverter device can be switchably decoupled from the power grid via a decoupling switching element. In particular, the rectifier unit can be switchably connected to the power grid or grid transformer in order to bring about a separation in emergency operation mode, so that internal short-circuits of the semiconductor components of the converter device, of the rectifier unit or of the inverter unit do not lead to tripping of grid overcurrent fuses and thus to a total failure of the drive system. A very high degree of flexibility and immunity to faults can be achieved by the use of decoupling switching elements of the converter device on the motor side and on the grid side, so that a repair or replacement of a converter device is possible during operation.

In an associated aspect, the invention proposes a wind or water turbine system with a pitch drive device which comprises a three-phase motor which can be supplied with current by a drive circuit in accordance with an example embodiment described above. This aspect thus proposes a power system with pitch drive train in which one of the above proposed motor drive circuits is used for operation of the motor. This enables a high redundancy of the control electronics, a low probability of failure and an increased power yield to be attained, with a substantial reduction in the risk of failure of the drive.

According to a further associated aspect, a method is proposed for operation of a pitch motor drive circuit in which in normal operation the motor trains of the three-phase motor are supplied with power by both inverter units in a first switching position of the switching element. If there is an emergency operation situation, in particular a failure of a rectifier unit or a converter device, the switching element is switched to a second position, where the three-phase motor can be operated by means of the remaining inverter unit. The method for operation has a normal operating mode which corresponds to a known double converter operation and which has the advantages of the latter. In the event of failure of a converter device, for example in the case of power failure of the affected branch of the converter, failure of the rectifier unit, the inverter unit or DC intermediate circuit, it is possible to switch to emergency operation mode using the switching element, in which the defective rectifier unit/converter unit is advantageously decoupled and emergency operation can be performed out with the remaining intact inverter unit/converter device. The emergency operation can in principle represent a delta or wye circuit of the motor, where switching between wye and delta circuit is for example possible in a start-up phase, so that an emergency operation can be maintained at reduced speed or reduced torque.

In an advantageous embodiment of the method, it is possible to switch between normal operation and emergency operation depending on the drive loss of the three-phase motor, in the event of failure of or a reduction in the DC intermediate circuit voltage or a non-synchronized inverter output voltage. To detect a case of emergency operation, indirect determination of the drive output or speed of the three-phase motor may be used, but it is also possible that electrical quantities can be considered, for example by monitoring of the DC intermediate circuit voltage, of the synchronized complementary PWM voltages of both converter devices or by monitoring of the grid voltage, where a case of emergency operation can be initiated in the event of divergence from a set point, and the emergency operation can be initiated by decoupling a converter device or by switching of the switching element into the second switching position. Thus, automated monitoring between normal operation and emergency operation can be achieved, where a fault message can be sent to a higher-level control point in the event of switching to the emergency operation mode.

According to a further advantageous embodiment of the method, in the case of intact inverter units or converter devices an alternating emergency operation may be performed with alternating use of the two inverter units/converter devices over a longer period of time, in particular within time intervals that can be predetermined or during drive phases that can be predetermined or detected. To improve drive performance, it is possible where necessary, particularly within certain drive phases, to switch to normal operation. It is thus proposed in this method to provide current in an alternating or continuous mode to the three-phase motor with only a single inverter unit in a "quasi-normal operation". This spares a second inverter unit or both inverter units are subjected to the same loads by alternating the switching of the current supply over longer time periods, so that the total service life of the drive circuit is doubled. If a higher performance is required or if a higher speed is necessary in a particular case or in drive phases that can be predetermined, then it can be switched to double inverter operation, described above as normal operation, so that a more or less normal operation with low loading of the motor and a high-performance normal operation can be achieved by using the double converter function. This enables a very high flexibility, redundancy and safety of the drive circuit plus provision of a drive output that meets requirements.

DRAWINGS

Further advantages are obtained from the present description of the drawing. Example embodiments of the invention are shown in the drawing. The drawing, the description and the claims contain numerous features in combination. A person skilled in the art will also expediently consider the features individually and group them together to yield meaningful further combinations.

Figure 3:
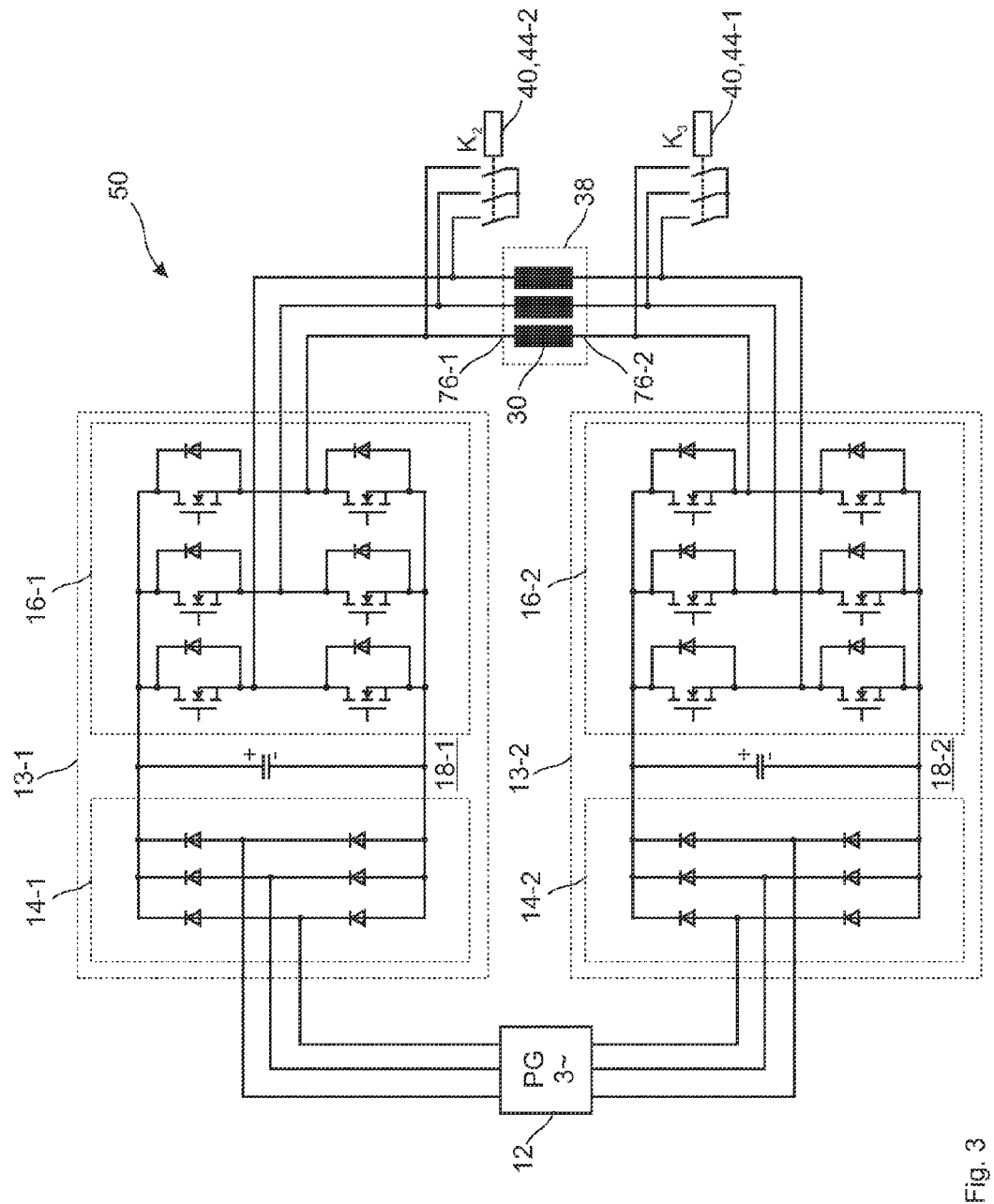
Figure 4:
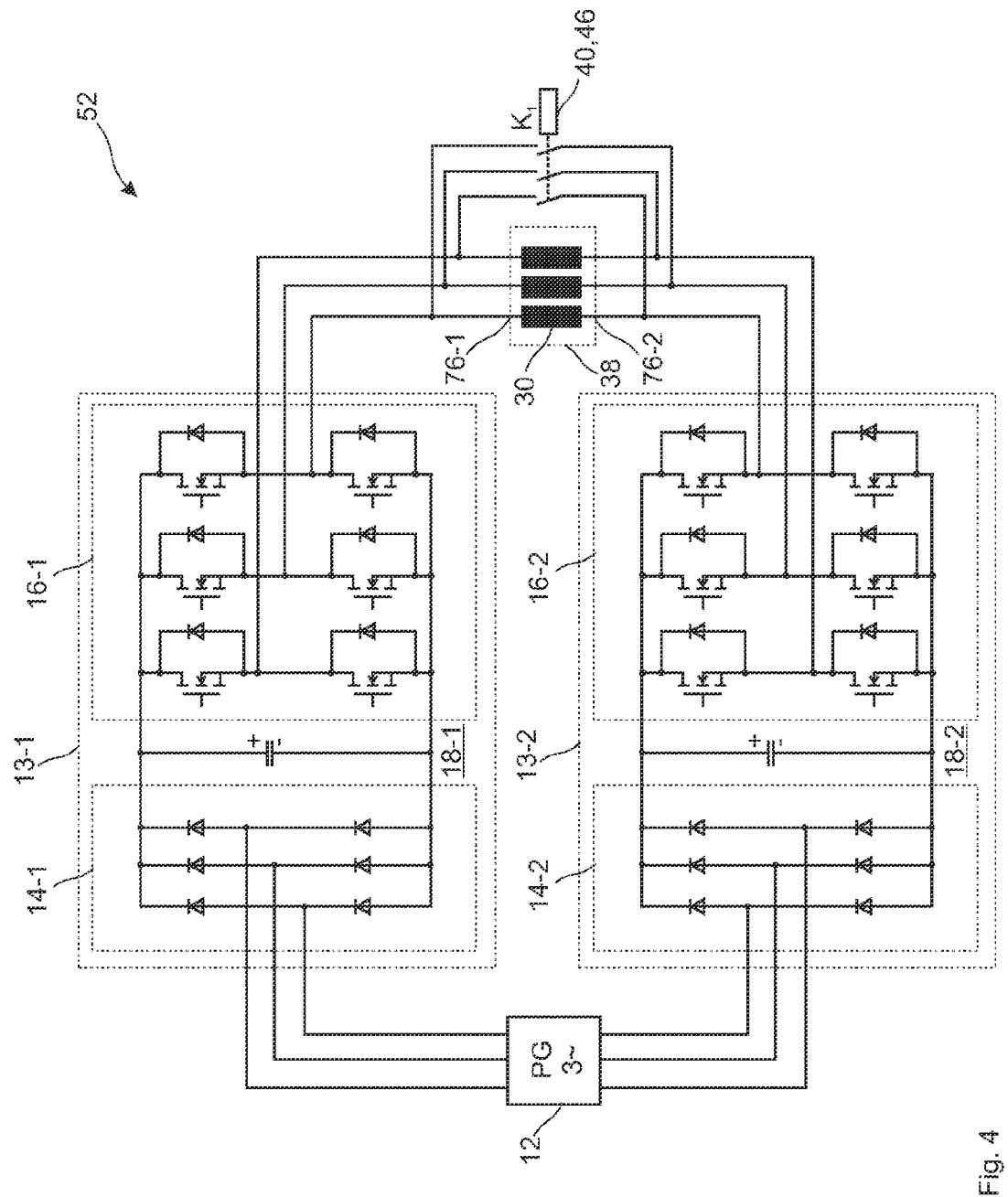
Figure 5:
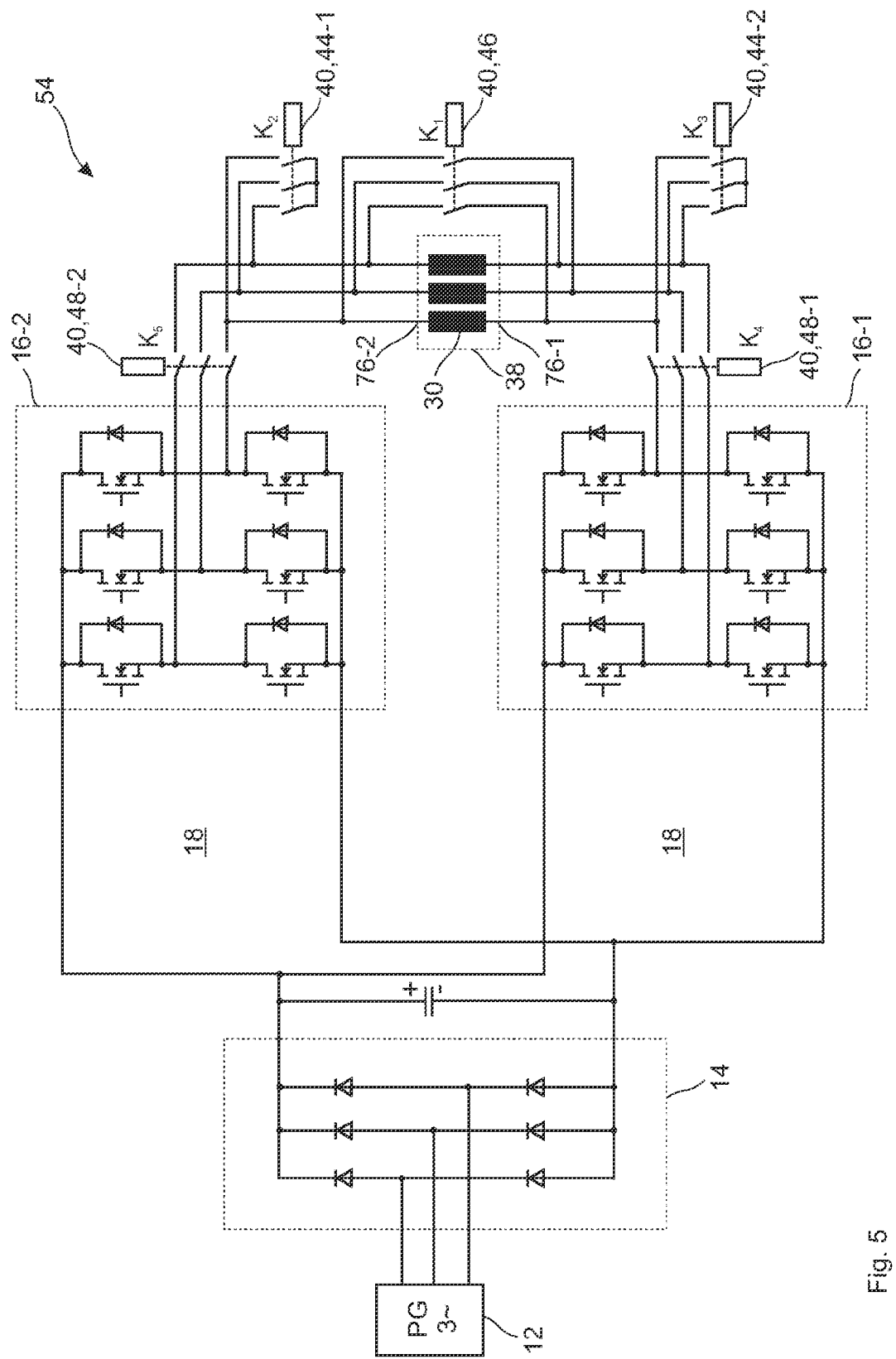
Figure 6:
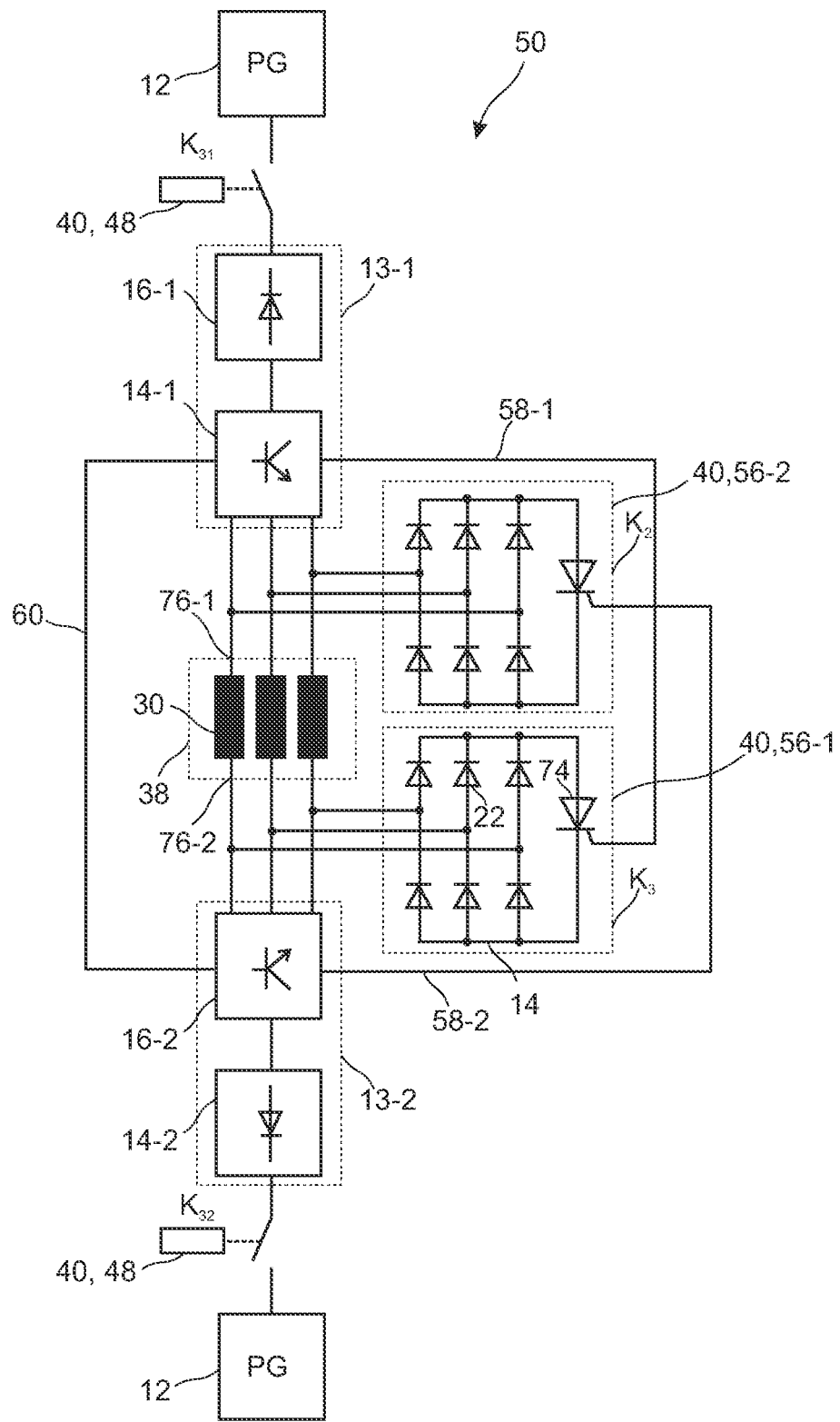
Figure 8:
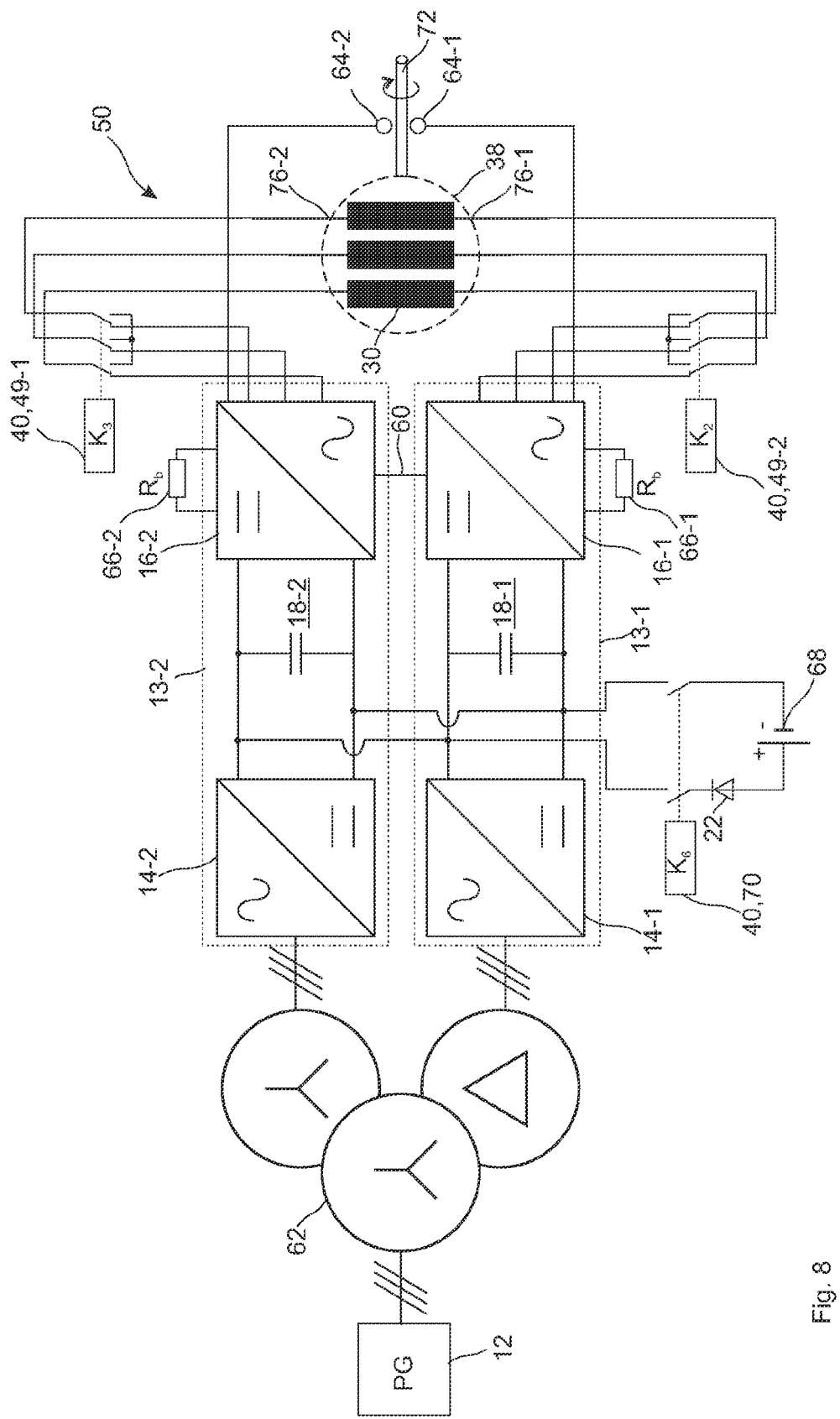
Figure 9:
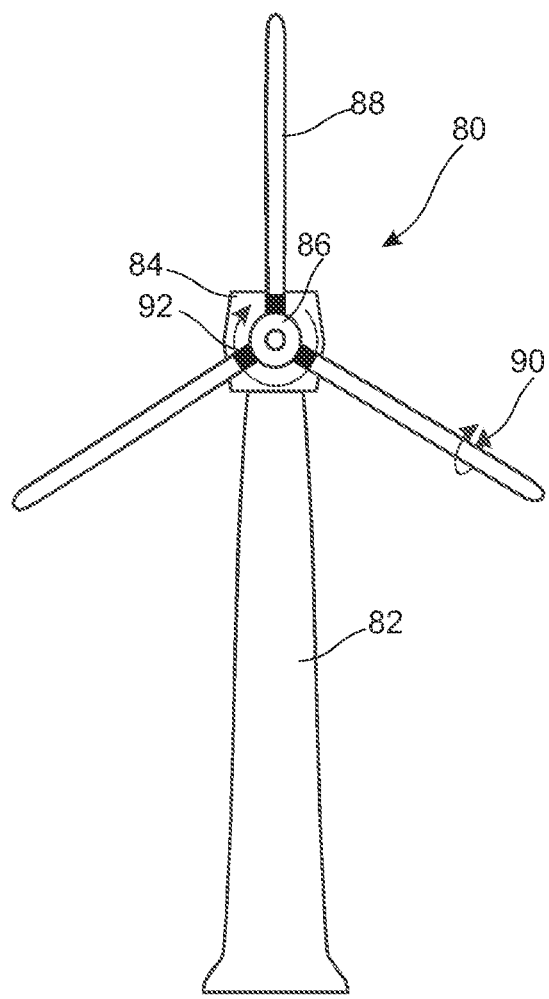

The drawing shows in:

FIG. 1 an inverter drive circuit of the prior art;

FIG. 2 two variants of redundantly designed pitch drives of the prior art;

FIG. 3 a first embodiment of a pitch drive circuit according to the invention;

FIG. 4 a second embodiment of a pitch drive circuit according to the invention;

FIG. 5 a further example embodiment of a pitch drive circuit according to the invention;

FIG. 6 an example embodiment of a pitch drive circuit with semiconductor switching elements;

FIG. 7 semiconductor switching elements for use in an example embodiment of a pitch drive circuit according to the invention;

FIG. 8 a transformer-coupled pitch drive circuit of an example embodiment;

FIG. 9 a wind power system with a pitch drive system that can be operated in emergency operation mode using an embodiment of a pitch drive circuit.

The same or similar components are designated by the same reference numbers in the Figures.

FIG. 1 shows a converter device 10 of the prior art for supplying current to a pitch drive three-phase motor 38, the motor trains 30 of which are connected in a wye circuit. The converter device 10 is connected to a supply grid 12 (power grid) in a three-phase circuit, where the three grid phases are converted into DC voltage by a rectifier unit 14 contained in the converter unit 10 by means of bridge rectifier diodes 22, which supplies an inverter unit 16 with DC voltage by means of a DC intermediate circuit 18. To stabilize the DC voltage, one or more intermediate circuit capacitors 24 is/are arranged in the intermediate circuit 18 and store DC energy/can absorb regenerative energy of the motor and smooth the ripple of the DC voltage. The inverter unit 16 comprises three power semiconductor switching bridges in each of which two power semiconductor switching elements 26, for example IGBT, MOSFET or IGCT transistors, are arranged for the formation of a PWM-modulated output voltage (pulse width modulation). The power semiconductor switching elements 26 feed the DC bridge rectifier voltage as PWM voltage into the motor trains of the three-phase motor 20. Diodes 28 are arranged in parallel to the inverter switching elements 26 in freewheeling mode, so that an increased service life and protection against inductive voltage peaks can be achieved. A drive control logic system (not shown) actuates the six inverter switching elements 26 such that a desired rated speed/a desired torque of the three-phase motor 20 can be achieved by commutation of the train currents. The drive control unit can comprise current/voltage sensors and/or mechanical speed, rotation angle and torque sensors for generating PWM signals that meet requirements in order to provide a desired drive behaviour of the three-phase motor 20. The three-phase motor 20 in a Y-circuit has a single contact side on which the three motor trains 30 can be contacted on one side from the outside. The failure of the power grid 12, the bridge rectifier unit 14, a short-circuit of the intermediate circuit capacitor 24 of the intermediate circuit 18 or an inverter switching element 26 of the inverter unit 16 leads to a total failure of the drive system. Since three-phase motors 20 are generally of robust design, there is a much higher probability of failure of the drive circuit than a mechanical failure of the motor. A redundancy is therefore provided in drive trains that are relevant to safety, as shown, for example, in FIG. 2.

Figure 2A:
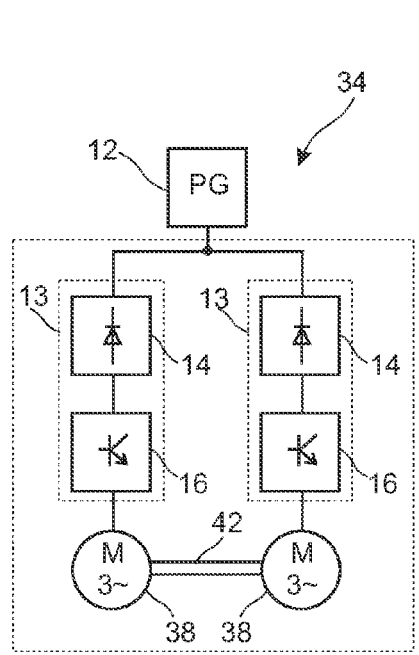

FIG. 2a shows a completely redundant motor drive system 34 which has two electrically separate drive units, where each drive unit comprises a three-phase motor 38 and a converter device 13. The converter device 13 in turn comprises a rectifier unit 14 and an inverter unit 16. Commencing from the power grid 12, the two drive units are electrically connected in parallel, where the motors are mechanically coupled to one another by a mechanical coupling 42 and together drive a mechanical load. If one drive unit fails, then the drive task can be performed by the remaining second motor train at 50% of drive power. The costs for this drive train redundancy are twice as high as the cost of a single drive unit, so that a system redundantly designed in this way is used only in rare cases in which a high availability is required.

Figure 2B:
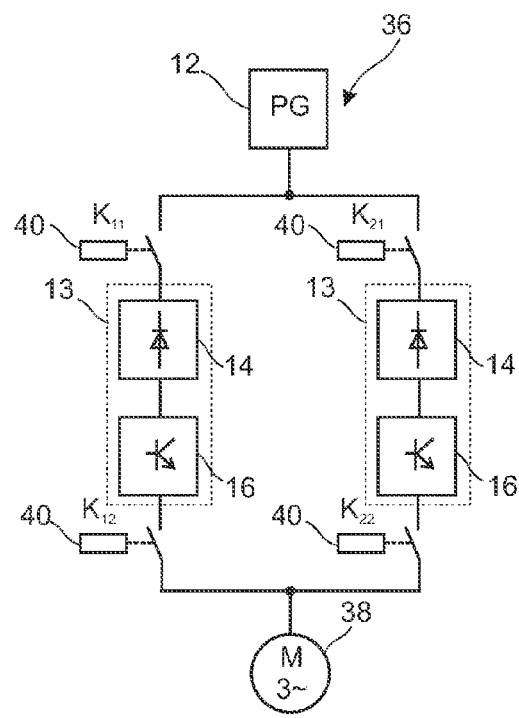

As an alternative, FIG. 2b shows a further redundant drive system 36 in which only the drive circuit is redundant, and the two partial drive circuits are connected to a single three-phase motor 38. Each part drive circuit comprises a converter device 13, where the two converter devices 13 are arranged in parallel between the power grid 12 and the three-phase motor 38, and can be coupled to the power grid 12 and the three-phase motor 38 by two assigned switching elements 40 K11, K12/ K21, K22 respectively. If a converter device 13 fails, then it can be decoupled from the power grid 12 and from the three-phase motor 38, and the second converter device 13 can be coupled to permit an interruption-free redundant operation. The cost of the electronic system is thereby doubled, but the much more expensive mechanical components of the three-phase motor 38 can be provided only singly, compared to the completely redundant drive systems shown in FIG. 2a. In both cases, only drive characteristics as shown in the drive system of FIG. 1 are possible, so that in principle only a single converter operation is enabled and a redundancy is kept available only for emergency operation.

FIG. 3 shows a first example embodiment of a pitch drive circuit 50 according to the invention. The drive circuit 50 is designed for a Y-emergency operation and is based fundamentally on a double converter operation of a three-phase motor 38. Since the motor 38 can be considered to be a robust component, it has a low probability of failure, so that there is no need for a redundant design of the electromechanical drive. The converter devices 13-1, 13-2 are considerably more susceptible to external influences, for example grid overvoltage and lightning strikes, and are therefore considered critical, where redundancy of the electrical components is assured by a double converter drive circuit. The two converter devices 13-1 and 13-2 are connected in parallel to a DC voltage power grid 12. Each converter device 13 comprises a rectifier unit 14, an intermediate circuit 18 with intermediate circuit capacitor 24 and an inverter unit 16, which comprises three inverter unit switching bridges. The motor trains 30 of the three-phase motor 38 have two externally accessible contact sides 76-1, 76-2 by which each motor train 30 can be supplied with current on both sides. Each motor train 30 is connected on each contact side 76 to the half-bridge of an inverter unit 16. This provides a double converter functionality so that in the case of synchronized operation of the two converter devices 13 a three-phase motor 38 can be used with increased rated voltage compared to the wye circuit ($\sqrt{3}$), resulting in a higher speed. The two converter devices 13 can be advantageously synchronized to one another to achieve a matched PWM modulation, where the intermediate circuits are also advantageously connected at least electrically in a switchable manner so that, for example a closed current flow is ensured in the case of coupling of the entire circuit via a transformer to the power grid. By the use of two converter devices 13, the risk of failure of one converter device 13 is increased compared to operation with a single converter device 13, as shown in FIG. 1. To provide redundancy and to ensure an increased operational reliability even with double converter operation, a Y-switching element 44 K2 is arranged on a first contact side 76-1, which in the event of failure of the inverter device 13-1 is transferred into a closed switching position so that there is a wye connection of the motor trains 30 on the first contact side 76-1 and a wye circuit operation of the motor 38 can be ensured by means of the converter device 13-2. In an equivalent manner, a further Y-switching element 44-1 is arranged on the second contact side 76-2 which in the event of failure of the converter device 13-2 can be switched to a second switching position and thus the motor can be operated in a wye circuit in emergency operation mode by means of the converter device 13-1. Thus a double converter circuit is proposed for normal operation in which the two switching elements 44-1 and 44-2 are in an idling state and in the event of failure of one converter device 13-1 or 13-2 a wye circuit can be realised for an emergency operation so that the remaining converter device 13 can continue to drive the motor 38.

FIG. 4 shows in this respect a circuit equivalent to that in FIG. 3, but in this case a single switching element 40 is designed as a Δ-switching element 46 which connects the motor drives of a first contact side 76-1 to the motor trains of a second contact side 76-2 in such a way that in the second switching position a delta circuit is provided for emergency operation. Thus, in emergency operation for example, the U-motor train of the first contact side 76-1 is connected to the V-train of the second contact side 76-2, the V-train of the first contact side is connected to the W-train of the second contact side, and the W-train of the first contact side is connected to the U-train of the second contact side. This yields on the one hand the advantage of a delta circuit with which a high rated speed can be reached, and on the other hand an interruption-free delta operation of the motor 38 can be achieved, regardless of whether the converter device 13-1 or 13-2 fails, by closing of the Δ-switching element 46. In comparison to FIG. 3, in emergency operation a delta circuit is achieved rather than a wye circuit. A corresponding logic unit, which can activate the Y-switching element 44 assigned to the still-active converter device 13 due to the failure of one converter device 13, is thus not necessary. It merely needs to be established that a converter device 13 has failed, so that the second switching position of the power switching element 46 is assumed and emergency operation follows.

Finally, FIG. 5 shows a combination of the emergency operating circuits shown in FIGS. 3 and 4, so that firstly a Δ-switching element 46, and secondly two Y-switching elements 74-1 and 74-2 are arranged on the corresponding contact sides 76-1 and 76-2 of the motor trains 30. In addition, the motor trains 38 are switchably connected to the inverter units 16-1 and 16-2 by decoupling switching elements 48, so that in the event of failure of one inverter unit 16-1 and 16-2 the defective inverter unit can be electrically decoupled from the motor trains of the motor 38. In this example embodiment 54, the AC voltage of the power grid 12 is converted by a single rectifier unit 14 into a DC voltage of an intermediate circuit 18, where the DC voltage of the intermediate circuit 18 is made available to both inverter units 16-1 and 16-2 together. Thus there is a redundancy only of the inverter units 16, but not of the bridge rectifier unit 14. Compared to the example embodiment shown in FIGS. 3 and 4, the number of semiconductor components can be reduced and costs can be saved. A double converter operation is possible, and in emergency operation mode can be switched between a wye circuit, in which a maximum high starting torque can be achieved, and a delta circuit in which a high rated speed can be reached.

FIG. 6 shows in schematic form an example embodiment of a drive circuit in which two independently available grid access units 12 are switchably coupled via decoupling switching elements 40 K31 and K32 to a converter device 13-1/13-2 respectively for AC power supply. The converter devices 13 supply current in normal operation to the motor trains 30 of the three-phase motor 38 in a double converter operation. Semiconductor switching elements 56-1 and 56-2 are used to achieve a wye circuit for emergency operation. These semiconductor star-point switching elements comprise a rectifier unit 14 which rectifies the train voltages of the three short-circuiting motor trains 30, and a thyristor switching element 74 that can short-circuit the rectified voltages. The switching time of a semiconductor switching element 56 is substantially shorter than that of an electromechanical switching element, such as a contactor, enabling reliable switching to emergency operation at higher speed, for example in interruption-free operation. Furthermore, semiconductor switching components 22, 74 are virtually maintenance-free, and in mass production are cheaper than contactors. A communication control line 60 is provided to synchronize the converter devices 13-1 and 13-2, and has a digital basis and uses a field bus system, to exchange parameterized process data between the two converter devices, which can be used for example as master and slave. The master sets the PWM modulation frequency and the timing while the slave generates PWM signals in a complementary manner. Error messages can be exchanged via the communication control line between the two converter devices 13. Furthermore, a zero current control can be performed in which the corresponding data to minimize the zero current can be transmitted by the communication control line. In the event of failure of one converter device 13, the remaining converter device 13 can activate the semiconductor star-point switching element arranged on the opposite contact side 76 by means of an emergency operation control line 58, so that the corresponding star point can be short-circuited by the thyristor switching element 74. The drive circuit operates without electromechanical components and is thus particularly durable. During emergency operation, it can bring about a switch between double converter normal operation and wye circuit emergency operation.

Figures 7A, 7B:
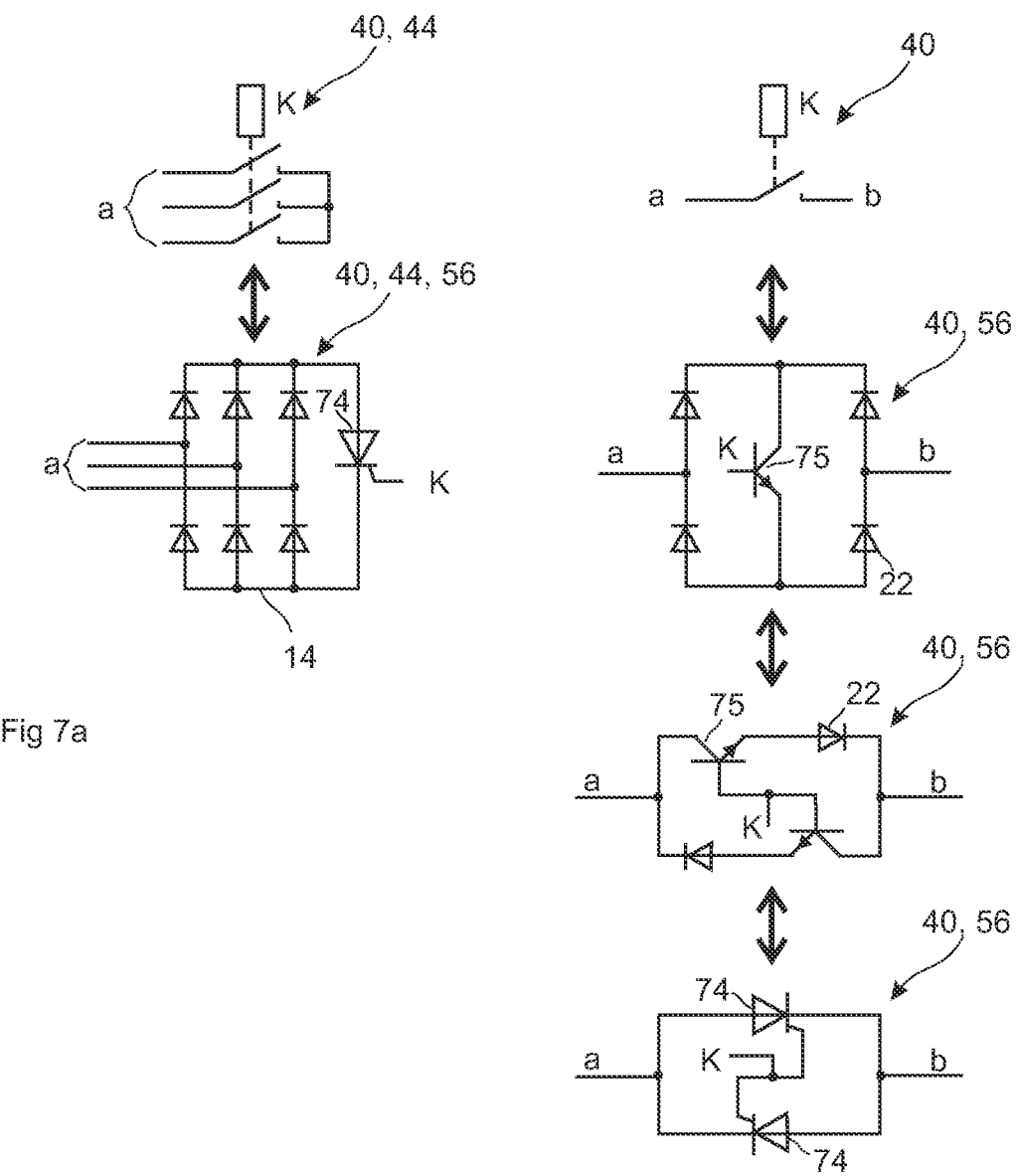

FIG. 7 shows a number of example embodiments of semiconductor switching elements 56 which can be used within a drive circuit 50, 52 or 54: FIG. 7a firstly shows a Y-switching element 44 comprising an electromechanical contactor to switchably short-circuit the three phase trains 30 of a contact side 76. Shown below it is the semiconductor component circuit 56 already discussed in relation to FIG. 6, which comprises a bridge rectifier unit 14, where the DC voltage paths can be short-circuited by means of a switchable thyristor switching element 74. A maintenance-free Y-switching element 44 with a long service life can thus be created.

FIG. 7b shows further alternative embodiments of bidirectionally switching semiconductor switching elements 56, which are designed for single-pole operation, where for three-phase operation three of these switching elements 56 can be used in parallel. A switching element 40 conventionally comprises an electromechanical switching contactor, which comprises one or more switching contacts to provide a switchable connection between the contact points a and b. Alternatively, a semiconductor switching element 56 can comprise a bridge rectifier with four diodes 22 as well as a transistor switching element 75, where the transistor switching element 75, similarly to the switching element 56 shown in FIG. 2a, can bring about a connection between the two DC voltage paths, to permit a switchable alternating current flow through the bridge rectifier arrangement. In addition, in a further alternative embodiment two anti-parallel switched diodes 22 can be connected in series to a transistor switching element 75 in order to form an alternating voltage semiconductor switching element 56 between the two contact sides a and b. Finally, an anti-parallel circuit of two thyristor switching elements 75 is conceivable for the achievement of a semiconductor switching element 56, corresponding to the basic circuit of a triac. Furthermore, other combinations are conceivable for a bi-directional semiconductor switching element 56 to achieve a rapid and maintenance-free switching pattern under mechanically difficult conditions in a power plant in which high acceleration forces may arise. No switching sparks are seen, as a result of which the semiconductor switching elements 56 are suitable for use in explosion-protected areas.

FIG. 8 shows a further example embodiment of a drive circuit 50 for the three motor train windings 30 of a three-phase motor 38 of a pitch drive. The power grid 12 is connected via a Yyd isolating transformer 62 to two converter devices 13-1 and 13-2. The Yyd transformer enables a 12P rectification in which harmonic waves with the 5th and 7th harmonics of the grid frequency are not seen, so that a reduced level of total harmonic distortion is passed to the grid.

The intermediate circuits 18-1 and 18-2 of the two converter devices 13-1 and 13-2 are electrically connected to one another, where a DC emergency power storage unit 68, for example a highly capacitive battery or a rechargeable battery or a capacitor arrangement, can switchably supply power to the intermediate circuits 18 via an emergency power switching element 70 and a decoupling diode 22, so that in the event of failure of, for example the grid transformer 62 or the power grid 12, a double converter operation/emergency operation of the motor 38 can be guaranteed at least for a short time. The emergency power storage unit 68 can absorb the regenerative energy of the motor 38 or be recharged using the intermediate circuit voltage if a rearward flow from the intermediate circuit to the emergency power storage unit 68 is possible; this can be achieved, for example, by an active decoupling/charging circuit and/or the decoupling semiconductor component. The coupling of the emergency power storage unit 68 to the intermediate circuits 18-1, 18-2 can also be implemented without an emergency power switching element 70 and be permanently achieved using decoupling semiconductors, for example one or more decoupling diodes 22 or decoupling diacs. It is furthermore conceivable for the two intermediate circuits 18-1, 18-2 to be supplied separately and independently of each other by the emergency power storage unit 68 by means of two emergency power switching elements 70; in this case it is advantageous to provide a further decoupling switching element 48 in the connection of the two intermediate circuits 18-1, 18-2.

The inverter units 16-1 and 16-2 can supply current to the two motor trains 30 in double converter mode, where in the event of failure of one converter device an emergency operation in wye circuit is enabled by means of the remaining converter device 13 by switching of a Y-switching element 40, 49. The Y-switching elements 49 are designed as three-pole or six-pole switching elements, where switching achieves a decoupling from the faulty inverter unit 16 and at the same time a wye circuit of the motor trains 30. Consequently, separate decoupling switching elements 48 can be saved and an idling position of the Y-switching element 49 can bring about a wye circuit so that greater safety is achieved by decoupling of the motor trains 30 in an idling state or in the event of a defect. The two inverter units 16-1 and 16-2 are equipped with braking chopper units 66, which can absorb the regenerative energy of the motor 38, so that the intermediate circuit 18 is not overloaded. The two braking chopper units 16-1 and 16-2 can be alternately switched to absorb a higher output, and in the event of failure of a braking chopper unit 16 braking chopper operation can be maintained by the remaining braking chopper unit 16. Each inverter unit 13-1 and 13-2 comprises at least one mechanical rotary angle sensor 64-1 and 64-2, which is arranged on the drive train 72 of the motor 38 in order to record phase-correct PWM connection of the motor rotation angle. One of the two converter devices 13-1, 13-2 operates as a master and can coordinate via a communication control line a synchronized double converter operation with the other converter device 13 as a slave.

Finally, FIG. 9 shows a wind energy system 80, in which a pod 84 is arranged on a mast 82, and a rotor axis 86 is rotatably mounted inside the pod 84, at the longitudinal end of which three rotor blades 88 are radially arranged. To control the speed and energy consumption of the wind energy system 80, the pitch angle 90 of the rotor blades 88 can be controlled by means of a pitch drive device 92. To facilitate this, a pitch drive device 92 is arranged on each root of a rotor blade 88, said pitch drive device comprising a three-phase motor for adjustment of the pitch angle. The pitch drive motors shown in the above-mentioned example embodiments permit control of the pitch angle relative to the oncoming wind, where the double converter operation provides a high performance capability of the motor 38 and hence pitch adjustment even at high wind loads and at high speeds, and in the event of failure of one converter device 13 the emergency operation capability in the second switching position permits emergency movement, for example into the feathering position. Thus, a pitch drive device 92 is proposed which has a high efficiency and substantial drive output, where in the event of an incident an emergency operation is enabled and in which motor operation is ensured both in a wye circuit and a delta circuit at a high speed/at a high torque.

The drive circuit according to the invention is based on a double converter circuit that is extended by at least one switching element to permit in emergency operating mode a wye or delta circuit with a single remaining converter device. A wye circuit can be maintained in emergency operating mode in which a full torque is possible at reduced maximum speed, as well as a delta circuit which enables maximum speed at reduced torque. For the delta circuit, only a single switching element is required for emergency operation. A standard motor can be used as the three-phase motor, in which all six motor train ends are led out, this representing a standard for asynchronous motors and being in principle possible with synchronous motors. Since two converter devices are used, their encoders or rotary encoder evaluations can be used for redundancy purposes. An alternative feed of current to the intermediate circuit is possible by an emergency power storage device. The intermediate circuits of the two converter devices can be coupled to each other, to so that double converter operation remains possible even if one rectifier device fails. Instead of double converter normal operation, it is possible in emergency operating mode for one converter device to operate the motor during one time interval and for a second converter device to operate the motor during another time interval in a wye circuit or delta circuit in an alternating manner, as a result of which the service life of the drive circuit is extended. During certain phases, in which high outputs have to be made available, switching to double converter operation is possible. This is of particular advantage with wind turbines, since in normal pitch operation high speeds and rotation performances are typically necessary so that the converter devices can be operated on a daily or weekly basis in an alternating manner. Data communication between the two converter devices enables a minimization control of the zero current portions. If switching elements are provided for both the wye circuit and delta circuit, then in emergency operation it is possible to switch between these two types of basic circuit. Even in an emergency operation mode wye circuit, a single switching element suffices, if it can be ensured that a given converter device can be operated further, in particular if it is of more robust design or is redundant. By means of a communication control line between the two converter devices it is possible for fault messages, zero current control information and synchronization information to be exchanged, enabling an efficient double converter operation.

The invention claimed is:

1. Pitch drive circuit which can operate in emergency mode for a wind or water turbine system, comprising:
   at least one rectifier unit,
   at least one DC intermediate circuit,
   a first inverter unit and a pitch three-phase motor with motor trains that can be contacted on both sides, where a first contact side of the motor trains is connected to the first inverter unit, a second contact side of the motor trains is connected to a second inverter unit and at least one switching element is connected to at least one contact side of the motor trains, so that during normal operation of a first switching state of the switching element the motor trains can be supplied with current by both inverter units, and in an emergency operation of a second switching state of the switching element the motor trains can be supplied with current by a single inverter unit,
   wherein each converter unit is switchably connected via one decoupling switching element to the supply network, and each inverter unit is switchably connected via at least one decoupling switching element to the motor trains of a contact side, and both inverter units are connected to a braking chopper unit.

2. Circuit according to claim 1,
wherein
in the second switching state of the switching element the contact side of the motor trains can be short-circuited to form a Y-circuit, where each contact side is connected to one switching element.

3. Circuit according to claim 2,
wherein
at least one Y-switching elements on opposite contact sides are connected to form a Y-circuit, and a further Δ-switching element in the second switching position is connected to the motor trains to form a Δ-circuit.

4. Circuit according to claim 1,
wherein
in the second switching state of the switching element the two contact sides of the motor trains can be connected to one another to form a Δ-circuit.

5. Circuit according to claim 4,
wherein
at least one Y-switching elements on opposite contact sides are connected to form a Y-circuit, and a further Δ-switching element in the second switching position is connected to the motor trains to form a Δ-circuit.

6. Circuit according to claim 1,
wherein
at least one switching element is a semi-conductor switching element.

7. Circuit according to claim 1,
wherein
each inverter unit is connected to one rectifier unit with DC intermediate circuit to form an independent converter device, where the two DC intermediate circuits of the two converter units are connected to one another.

8. Circuit according to claim 7,
wherein
the two converter units are connected to a supply network via an isolating transformer present twice on the secondary side, wherein the two intermediate circuits are electrically connected to one another at least switchably.

9. Circuit according to claim 1,
wherein
a zero current control unit is connected to both inverter units to minimize a zero current through the motor trains in normal operation.

10. Circuit according to claim 1
wherein
a DC emergency energy storage device is connected at least switchably to at least one DC intermediate circuit for voltage supply to the intermediate circuit in the event of failure of the grid-based DC voltage supply.

11. Wind or water turbine system with a pitch drive device for adjustment of the pitch angle of at least one rotor blade,
wherein
the pitch drive device comprises a pitch three-phase motor which is supplied with current by a motor drive circuit according to claim 1.

12. Method for the operation of a pitch drive circuit according to claim 1
wherein
three-phase in normal operation of a first switching position of the switching element the motor trains of the three-phase motor are supplied with current by means of both inverter units; and in an emergency operating mode, in particular in the event of failure of an inverter unit or a converter device, the switching element switches to the second switching position, where the three-phase motor can be operated by means of the remaining inverter unit.

13. Method according to claim 12,
wherein
switching between normal operation and emergency operation is carried out as a function of a drive loss of the three-phase motor, a failure of or reduction in the DC intermediate circuit voltage, or a non-synchronized inverter output voltage.

14. Method according to claim 12,
wherein
in the case of intact inverter units or converter devices, an alternating emergency operation proceeds over a longer period in alternating usage of both inverter units/converter devices, in particular within time intervals that can be predetermined or during drive phases that can be predetermined, and in that switching to normal operation is carried out to increase the drive output as required, in particular during certain drive phases.

* * * * *